United States Patent [19]

Piatt et al.

[11] Patent Number: 4,748,460
[45] Date of Patent: May 31, 1988

[54] SELF-CONTAINED NON-CONTACT WRITING DEVICE

[75] Inventors: Michael J. Piatt, Enon; Harry V. March, Beavercreek, both of Ohio

[73] Assignee: Eastman Kodak Company, Rochester, N.Y.

[21] Appl. No.: 1,775

[22] Filed: Jan. 9, 1987

[51] Int. Cl.⁴ .................... G01D 15/16; B43K 8/00
[52] U.S. Cl. .................... 346/140 R; 346/143; 346/140 A; 401/195
[58] Field of Search .............. 346/140, 140 A, 143; 401/195

[56] References Cited

U.S. PATENT DOCUMENTS

| | | | |
|---|---|---|---|
| 4,168,533 | 9/1979 | Schwartz | 346/1.1 X |
| 4,412,232 | 10/1983 | Weber et al. | 346/140 R |
| 4,436,439 | 3/1984 | Koto | 346/143 X |
| 4,500,895 | 2/1985 | Buck et al. | 346/140 R |

FOREIGN PATENT DOCUMENTS 2561992 10/1985 France .
58-107399 6/1983 Japan .
1214495 2/1986 U.S.S.R. .

Primary Examiner—Joseph W. Hartary
Attorney, Agent, or Firm—John D. Husser

[57] ABSTRACT

A self-contained non-contact writing device is disclosed that employs a thermal ink jet to transfer ink to a writing substrate. The problems associated with conventional direct contact writing devices are avoided by preventing direct contact of the ink transfer mechanism and the writing substrate.

3 Claims, 5 Drawing Sheets

SELF-CONTAINED NON-CONTACT WRITING DEVICE

BACKGROUND OF THE INVENTION (1) Field of the Invention

This invention relates to self-contained writing devices and in particular to those devices that employ non-contact method of transferring ink to a writing substrate.

(2) Background of the Invention

Present technologies employed in self-contained writing devices, rely on the contact between the writing substrate and the ink transfer mechanism of the writing device to transfer ink to the writing substrate. Examples of existing technologies include fountain pens, ball point pens and felt tip markers, all of which employ direct contact of the ink transfer mechanism to transfer ink to the writing substrate.

There are many disadvantages associated with direct contact writing devices. The ink transfer of such devices is effected by many variables including: the relative speed between the pen and substrate, the ink absorption rate into the substrate, and the surface roughness between the pen tip and the substrate. The many variables related to direct contact writing devices prevent the guarantee of uniform and consistent ink transfer to the writing substrate. Certain conditions, for example attempting to write on a smooth metal surface with a ball point pen, render the marking device non-functional. Most direct contact marking devices also rely on the force of gravity to feed ink to the substrate when held in a non-vertical position.

SUMMARY OF THE INVENTION

The object of the present invention is to provide a self-contained non-contact writing device that overcomes certain functional disadvantages of direct contact writing devices. This object is achieved by incorporating the use of drop-on-demand ink jet technology in a self-contained writing device.

A preferred embodiment of the invention provides a self-contained writing device having a drop-on-demand ink jet writing/cartridge as the ink transfer mechanism, circuit means for activating the writing/cartridge to eject ink droplets and means for providing proper spacing between the ink jet writing/cartridge and the writing substrate.

Ink is transferred to the writing substrate by a stream of discrete droplets propelled from the writing/cartridge when it is activated by the circuit means. Direct contact between the writing substrate and the ink transfer mechanism of the writing device is avoided. The aforedescribed disadvantages associated with the ink transfer of direct contact writing devices are therefore prevented.

BRIEF DESCRIPTION OF THE DRAWINGS

With the above as background, reference should now be made to the following figures for a detailed description of the invention.

DETAILED DESCRIPTION OF THE PREFERRED EMBODIMENT

Figure 1:
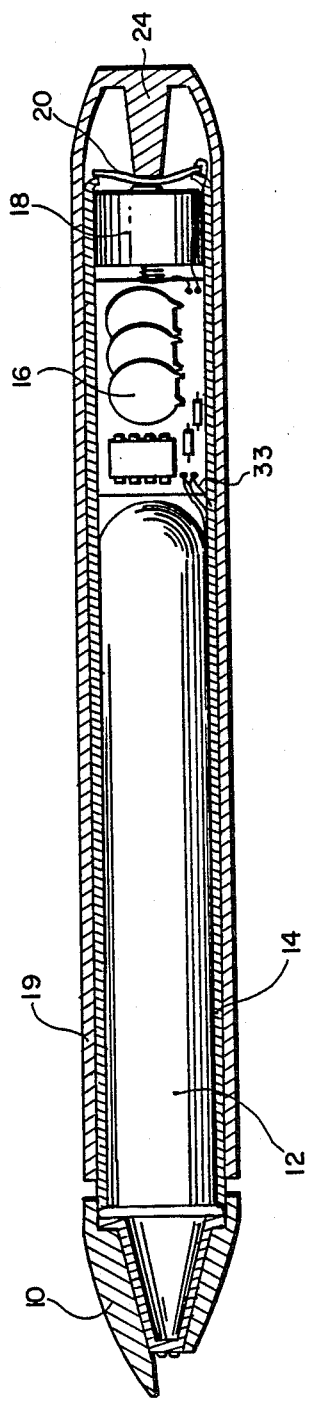
FIG. 1 shows a cross-sectional view of a preferred embodiment of the present invention.

Referring now to FIG. 1 of the drawings, a preferred embodiment of a non-contact writing device incorporating link jet technology is shown having a spacer tip 10, an inner housing 14, drive circuitry 16 and an outer housing 19. A disposable writing/cartridge 12 slides into inner housing 14 and is held in place by the spacer tip 10 which is releasably secured to the inner housing 14. A battery 18 is also mounted within the inner housing 14 to provide power to the drive circuitry 16. A spring switch 20 is provided at one end of the inner housing 14 that, when deflected, completes an electrical circuit beteen the battery 18 and the drive circuitry 16.

In order to operate the writing device 8, the operator presses the point of the spacer tip 10 against a writing substrate. The outer housing 18 slides over the inner housing 14 due to the pressure exerted by the operator. A protrusion 24 extending from the outer housing 18 deflects the spring switch 20 thereby completely the electrical circuit between the battery 18 and the drive circuitry 16. The drive circuitry 16 sends electrical impulses to the ink jet writing/cartridge via conductors not shown in FIG. 1. Ink droplets are ejected toward the writing substrate upon activation of the writing/cartridge 12 by the drive circuitry 16.

Figure 2:
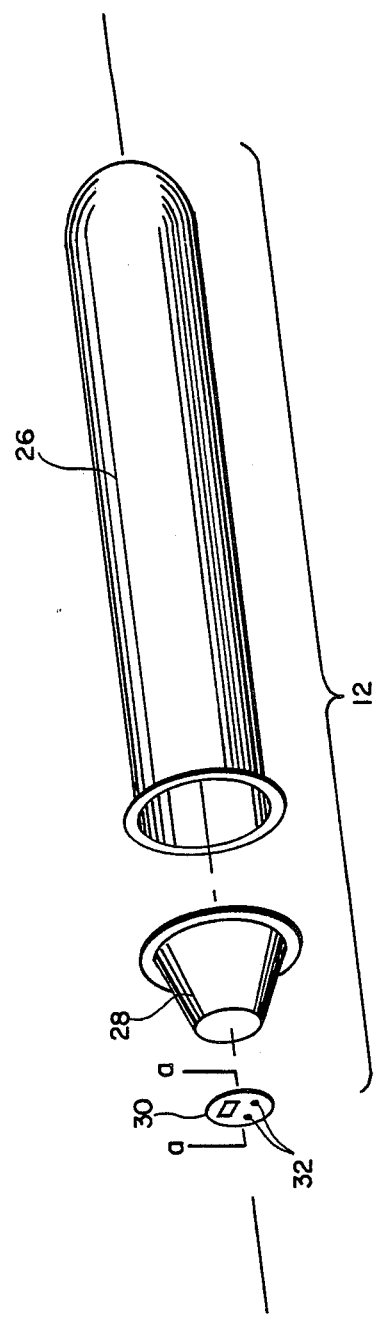
FIG. 2 shows an exploded view of a ink jet writing-/cartridge employed in the present invention.

Referring now to FIG. 2, a detailed drawing of a writing/cartridge 12 is shown. The writing/cartridge 12 consists of an ink bladder 26, a cartridge housing 28, and a jetting assembly 30. The jetting assembly 30 has contact pads 32 to which a flexible circuit 33 (not shown) may be directly bonded to provide electrical connection to the drive circuitry 16. The bladder 26 is molded from rubber and is completely filled with ink before being attached to the housing 28.

Figure 3:
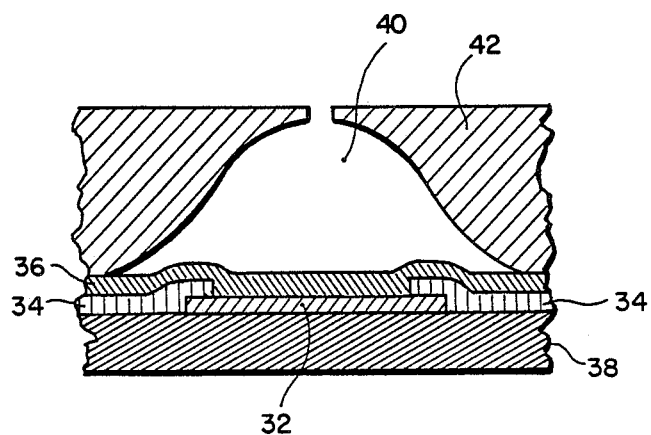
FIG. 3 shows a cross-sectional view of a jetting assembly taken along the line a—a shown in FIG. 2.

FIG. 3 shows a cross-sectional view of the jetting assembly 30 taken along the line a—a shown in FIG. 2. The jetting assembly 30 is constructed by using thin film techniques to deposit a resistive heater element 32, conductors 34, and protective passivation layer 36 on a substate 38. An electroformed orifice plate 42 is then bonded to the substrate 38 over the heater element 32 to form an ink chamber 40. Channels (not shown) in the substrate 38 provide a path for ink to flow by capillary action from the ink bladder 26 to the ink chamber 40. When the resistive heater element 32 receives an electrical signal pulse from the drive circuitry 16, a small amount of ink in the ink chamber 40 is vaporized causing a pressure increase that forces the ejection of an ink droplet through the orifice plate 42.

Figure 4:
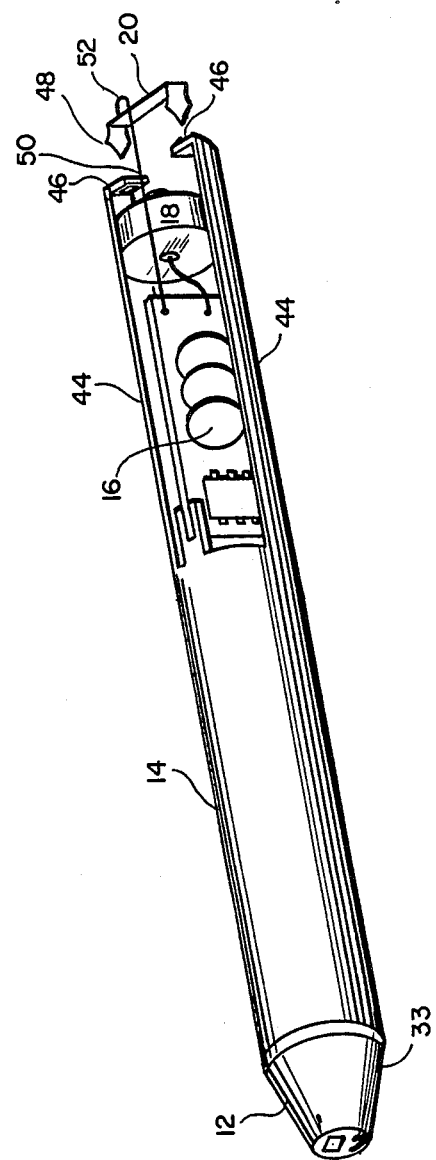
FIG. 4 shows a perspective view of the inner housing assembly of the preferred embodiment of the present invention.

The writing/cartridge 12 slides into the cylindrical shaped inner housing 14. One end of the inner housing 14 is cut away to leave two legs 44, as shown in FIG. 4. A printed circuit board containing the drive circuitry 16 fits between the "legs" 44 of the inner housing 14. The flexible circuit 33, that is connected to the contact pads 32, are led through a channel (not shown) cut in the inner housing 14 and connected to the drive circuitry 16. Connection is accomplished by inserting contact pins that are soldered to the flexible circuit 33 into sockets provided on drive circuitry 16. The ends of the legs 44 are turned inward to form feet 46 for mounting the spring switch 20. Space between the drive circuitry 16 and the spring switch 20 is provided for mounting a battery 18. The battery 18 may be of a type having and integral lead for connection to the drive circuitry 16.

The spring switch 20 is preferably formed from spring temper carbon steel and plated with a suitable material to prevent corrosion and provide good electrical conductivity. The switch 20 is formed from a thin strip of material and the ends are turned up to form a barb 48 that fit through the slots 50 in the feet 46 of the inner housing 14. The barbs 48 are bent over, after being inserted in the slots 50, to assure retention. The center section of the switch 20 is formed to a cross-curvature to provide relatively high stiffness in bending, but once bending begins the cross-curvature flattens and the resistance to bending decreases abruptly. This provides a snap action that results in tactile feedback to the operator indicating when sufficient force has been applied to the spacer tip 10 to activate the drive circuitry 16. Once pressure is released, the switch 20 returns to its original shape. A jumper wire 52 is soldered to the switch 20 to provide electrical connection to the drive circuitry 16.

Figure 5:
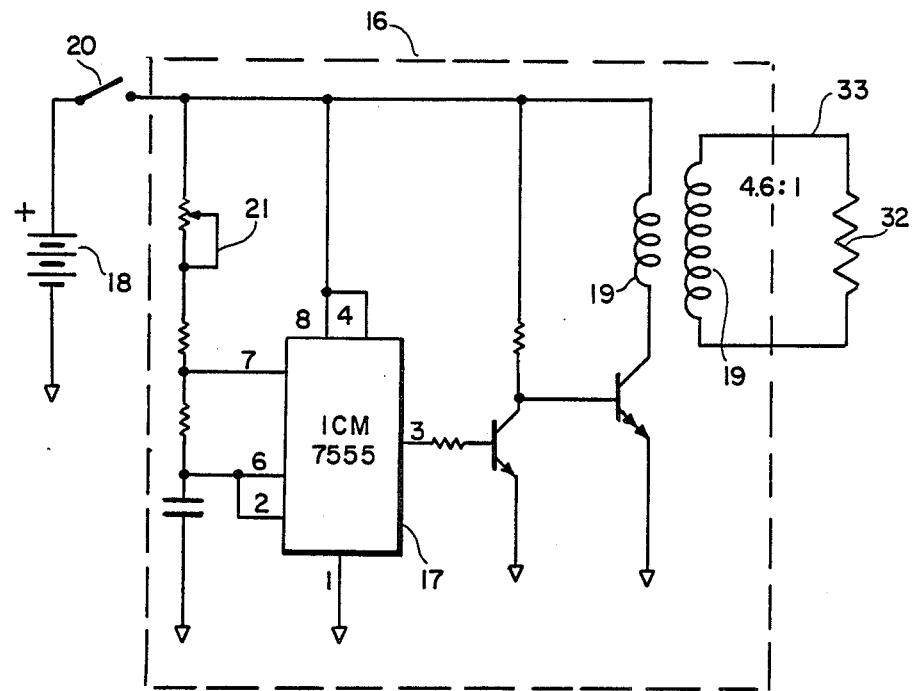
FIG. 5 is a schematic diagram of a circuit that may be employed as the drive circuitry for activating the writing/cartridge to eject ink droplets.

Several circuit designs may be employed for the drive circuitry 16. An example of one possible circuit design is shown in FIG. 5. The drive circuitry 16 shown in FIG. 5 employs a CMOS 555 timer chip 17 to generate the necessary signal pulses. A step-up pulse transformer 19 is utilized to increase the amplitude of the signal pulses to drive the heating element 32. Given a heating element 32 resistance of $\approx 62\Omega$, a voltage pulse having a 21.7 volt amplitude and $6\mu$ sec. duration is required to produce a 0.01" dot on the writing substrate through a 0.0025" diameter orifice. To produce a stream of ink droplets having a density high enough to form a solid line on the substrate, the drop generation rate should be between 400 Hz and 1200 Hz. A variable resistor 21 is provided in the drive circuitry 16 to vary the drop generation rate if desired. Other variable resistors and capacitors may be employed if the capability of changing the amplitude and duration of the pulse is desired. An optimum frequency that produces approximately 300 dots/inch resolution at "normal" hand writing speed has been determined to be 800 Hz. The drive circuitry 16 produces a stream of electrical pulses of the aforementioned amplitude and frequency when the switch 20 is deflected sufficiently to come in contact with the battery 18 and complete the electrical circuit.

The spacer tip 10 is attached to the inner housing 14 to secure the writing/cartridge 12 and to provide proper spacing between jetting assembly 30 and a writing substrate. The spacer tip 10 may be manufactured from plastic or metal, but in either case the finish of the spacer tip 10 is preferably identical to the finish of the outer housing 22 (for example gold plated).

The combined assembly of the spacer tip 10, the writing/cartridge 18, the drive circuitry 16, battery 18 and switch 20, then slides into the outer housing 22. The protrusion 24 within the outer housing 22 rests against the spring switch 20. To operate the writing device 8, the operator places the spacer tip 10 on a writing substrate. As pressure is applied, the outer housing 22 slides over the inner housing 14. The protrusion 24 deflects the spring switch 20 sufficiently to bring the switch 20 in contact with the battery 18 thereby providing power to the drive circuitry 16. Once activated, the drive circuitry 16 sends signal pulses via the flexible circuit 33 to the writing/cartridge 12. The signal pulses activates the jetting assembly 30 and ink drops are ejected toward the writing substrate.

The invention has been described with reference to certain preferred embodiments thereof, but it will be understood that variations within the spirit and scope of the invention are possible. For example, the preferred embodiment described allows for the disposal of the writing/cartridge 12 and the battery 18. Other embodiments employing rechargeable batteries are possible. Although the preferred embodiment employed a separate spacer tip 10 to provide proper spacing and protect the jetting assembly 30 of the writing/cartridge 12, the function of the spacer tip 10 could be incorporated into the housing 28.

What is claimed is:

1. A self-contained, non-contact writing device for use with a drop-on-demand ink jet writing/cartridge of a type having a self-contained ink supply and jetting means for ejecting ink droplets, said device comprising:
   a. inner housing means for retaining such a writing-/cartridge;
   b. circuit means for energizing the jetting means of a retained writing/cartridge to produce a writing stream of ink droplets;
   c. conductor means, mounted on said inner housing means, for providing electrical contact between said circuit means and a retained writing/cartridge;
   d. switching means coupled to said circuit means for activating said circuit means;
   e. spacer means, coupled to said inner housing means, for providing proper spacing between the jetting means of a retained writing/cartridge and a writing substrate; and
   f. outer housing means being slidably mounted on said inner housing means and constructed and located for the holding of said device during writing, said switching means being responsive to the movement of said outer housing means over said inner housing means and toward said spacer means to activate said circuit means.

2. A self-contained, non-contact writing device comprising:
   a. an ink jet writing/cartridge having a self-contained ink supply and jetting means for ejecting ink droplets;
   b. inner housing means for retaining said writing/cartridge;
   c. an electrical energy source mounted in said inner housing;
   d. switchable circuit means for electrically coupling said energy source to said writing/cartridge and for actuating said ink jetting means to produce a writing stream of ink droplets;
   e. spacer means for providing proper writing spacing between said jetting means and a writing substrate;
   f. outer housing means constructed for the holding of said device and for sliding over said inner housing means, toward and away from said spacer means; and
   g. switching means electrically responsive to the movement of said outer housing means toward and away from said spacer means to respectively close and open said circuit means.

3. The invention defined in claim 2 further including spring means for urging said outer housing away from said spacer means to a circuit open condition of said writing device and for yielding to pressure on said outer housing toward said spacer means to allow closing of said switching means.

* * * * *